United States Patent [19]

Kinoshita et al.

[11] Patent Number: 4,472,207

[45] Date of Patent: Sep. 18, 1984

[54] METHOD FOR MANUFACTURING BLANK MATERIAL SUITABLE FOR OIL DRILLING NON-MAGNETIC STABILIZER

[75] Inventors: Shushi Kinoshita, Akashi; Shinpei Denoh; Yoshio Kitamura, both of Takasago, all of Japan

[73] Assignee: Kabushiki Kaisha Kobe Seiko Sho, Kobe, Japan

[21] Appl. No.: 478,874

[22] Filed: Mar. 25, 1983

[30] Foreign Application Priority Data

Mar. 26, 1982 [JP] Japan ................................ 57-49678

[51] Int. Cl.$^3$ .............................................. C21D 9/00
[52] U.S. Cl. ................................... 148/12 B; 148/12.4
[58] Field of Search ...................... 148/12 B, 12.4, 36

[56] References Cited

U.S. PATENT DOCUMENTS 3,489,620 1/1970 Current ................................ 148/36
3,535,910 10/1970 Connolly ........................... 148/12.4
4,131,491 12/1978 Joseph ............................... 148/12 B
4,180,421 12/1979 Joseph et al. ..................... 148/12 B Primary Examiner—W. Stallard
Attorney, Agent, or Firm—Oblon, Fisher, Spivak, McClelland & Maier

[57] ABSTRACT

A method of manufacturing a blank for an oil drilling stabilizer, which includes the steps of hot-working a stock of non-magnetic steel into a rod-like shape work item with a bulging large-diameter portion at a median point between opposite ends thereof; subjecting the resulting rod-like work item to an ordinary heat treatment solution and a machining operation to obtain a semi-finished work item of a shape substantially conforming with the desired shape; and then subjecting the semi-finished work item to cold axial compressive working in a die cavity of a complementary shape and within a work hardening temperature range.

19 Claims, 14 Drawing Figures

METHOD FOR MANUFACTURING BLANK MATERIAL SUITABLE FOR OIL DRILLING NON-MAGNETIC STABILIZER

BACKGROUND OF THE INVENTION

1. Field of the Invention

This invention relates to a method of manufacturing stepped round rod-like blanks which are suitable for a non-magnetic stabilizer for oil drilling as one typical example of application, and more particularly to a method of uniformly imparting a high strength to such rod-like blanks by cold working.

2. Description of the Prior Art

Taking the stabilizer an oil drilling as for example, and in the case of the directional drilling method in which a number of holes are extended in a number of directions from a single rig, it is necessary to employ a drilling tool of a non-magnetic material over the length of about 500 m from the tip end of the tool in order to eliminate the influences of terrestrial magnetism in monitoring the position of the drilling tip end by means of a magnetic sensor, including a stabilizer of high strength and toughness as shown in FIGS. 1 and 2. The target values in the properties of the stabilizer are greater than about 70 kg/mm$^2$ in 0.2% proof stress and less than 1.01 in specific magnetic permeability. In FIG. 2, the double-dot-and-dash line indicates the shape of a blank 2 for forming the stabilizer 1 with stem portions 3, an intermediate bulging portion 4 and shoulder portions 5.

The production of stepped round rods by precipitation hardening has usually met with difficulties in obtaining high strength and toughness in addition to unsuitably low resistance to stress corrosion cracking, unless hardening by cold working is resorted to. However, the cold working involves various technical restrictions and difficulties due to the particular shape of the material and the severe values in target properties. Set forth hereinbelow are the problems or difficulties involved in the various conventional cold working methods.

(a) Tap Forging

In tap forging, which progressively stretches a rod axially by applying forces in the radial direction on a forging machine like a press equipped with a tool having a curved surface complementary to the shape of the stabilizer to be produced, is encountered in a problem; that the so-called dead metal which exists on the circumferential surface of the rod-like work item without undergoing work hardening because of the restriction of plastic flow by the frictional force between the contacting surfaces of the working material and the tool. Besides, the work item undergoes hardening to a considerable degree by a large localized flow of material in the shear strain zone at the boundary between an unloaded portion and a loaded portion including the dead metal. The conspicuous localized flow of material which takes place in the shear strain zone gives rise to fine internal or surface cracking of the material which can result in detrimental damage. Consequently, it is difficult to effect uniform hardening in view of the irregular deformation regions of the material by work hardening. Further, unless the applied force effectively reaches the internal portion of the material, there occur irregularites in properties between the internal and surface layer portions of the work as a result of surfacewise working of the material.

(b) Tensile Cold Working in Axial Direction

In cold tensile working of stepped rod-like work, it is possible to cause plastic deformation to the stem portions of smaller diameter but not to the bulging portion 4 of larger diameter. If the working operation is carried out on the basis of the large diameter portion, it will invite a marked drop in yield of the material. Although there barely occurs irregular distribution of strain in the cold axial tensile working of the rod, the resulting hardened material sometimes fails to possess the required strength due to Bauschinger effect depending upon the direction of the acting force. For example, application of a compressive load cannot impart a strength comparable to that as attained by application of a tensile load. Since the stabilizer is subjected to axial compression stress during operation, this working method is also unsuitable.

(c) Rotational Forging, Rolling and Extrusion

The material is worked only in a surface layer in most cases, so that it is difficult to strengthen the material over its entire sectional area. In addition, in the case of a work item of a shape like the stabilizer 2, there arises the necessity of providing special working equipment, coupled with the difficulty of strengthening the boundary portions between the large- and small-diameter portions of the rod.

SUMMARY OF THE INVENTION

It is an object of the present invention to eliminate the problems and difficulties of the abovementioned cold working in the production of the stepped rod-like blanks of high strength suitable for use as a stabilizer in oil drilling.

It is a more specific object of the present invention to provide a method capable of inducing substantially uniform hardening to impart uniform strength to various parts of a work by cold compressive working in the production of a stepped rod-like blank which is particularly suitable for use as an oil drilling stabilizer.

According to the present invention, there is provided a method of manufacturing a blank for an oil drilling stabilizer, the method comprising the step of hot-working a stock of non-magnetic steel into a rod-like shape with a bulging large-diameter portion at a median point between the opposite ends thereof; subjecting the resulting rod-like work item to an ordinary heat treatment solution and a machining operation to obtain a semi-finished work of a shape substantially conforming with the ultimate desired shape; and then subjecting the semi-finished work item to cold axial compressive working in a die cavity of a complementary shape and in a work hardening temperature range.

The above and other objects, features and advantages of the present invention will become apparent from the following description and the appended claims, taken in conjunction with the accompanying drawings which show illustrative embodiments of the invention.

BRIEF DESCRIPTION OF THE DRAWINGS

In the accompanying drawings:

FIG. 4(a) to 4(c) are vertically sectioned side views showing the work item in different stages of the cold compressive working operation according to the present invention, of which FIG. 4(a) shows a stage of setting the work, FIG. 4(b) a first phase of the compressive working, and FIG. 4(c) a second phase of the compressive working;

DETAILED DESCRIPTION OF THE PREFERRED EMBODIMENTS

Figure 1:
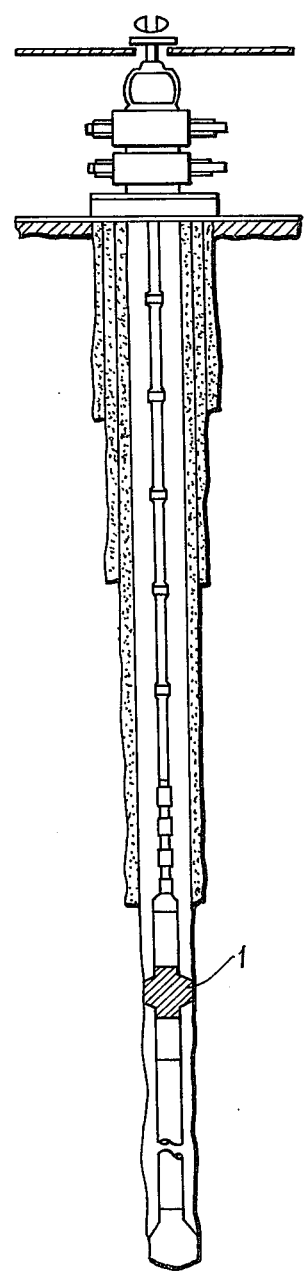
FIG. 1 is a schematic vertically sectioned view of oil well drilling, showing the position of a stabilizer.
Figure 2:
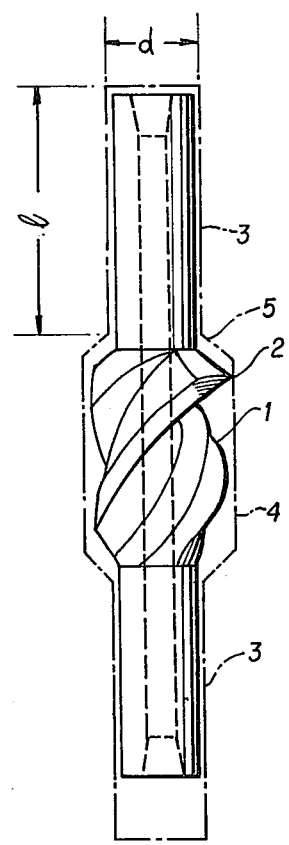
FIG. 2 is a schematic side view of an oil drilling stabilizer and a blank as obtained according to the method of the present invention.
Figure 3:
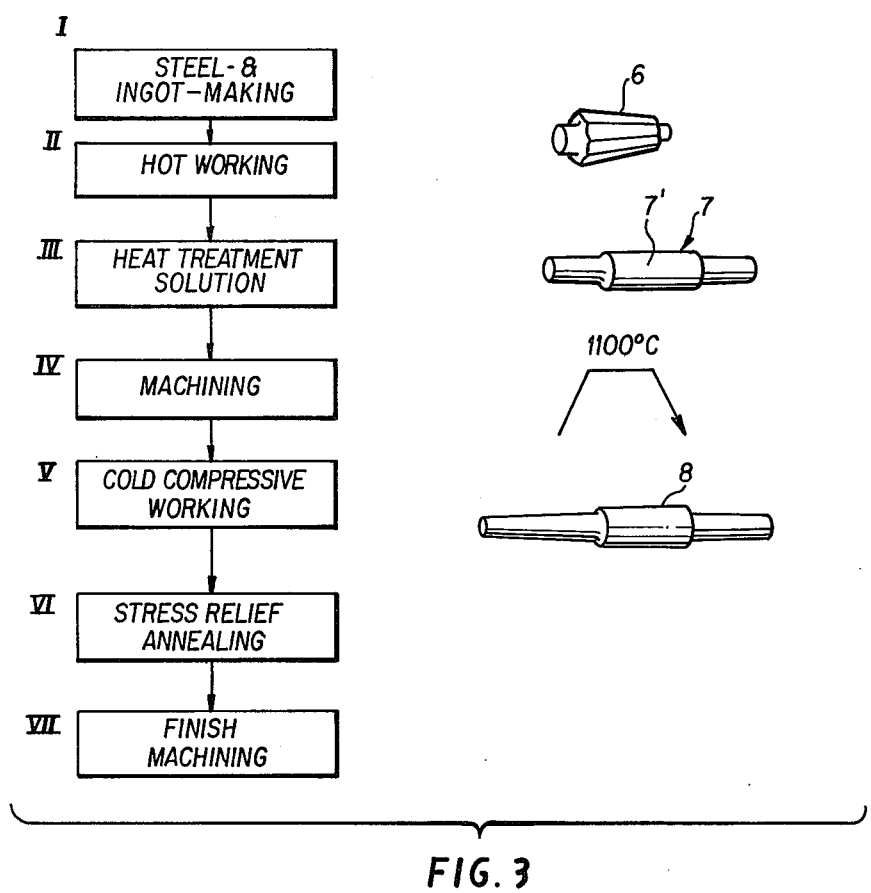
FIG. 3 is a flowsheet of a working process including the method of the present invention.

Referring to FIGS. 3 to 12 of the accompanying drawings and first to FIG. 3, there is shown the steps of the working process incorporating the present invention, in which a steel ingot 6 from a casting stage (I) is formed into a first semi-finished work 7 of a rod-like shape with a bulging large-diameter portion 7' at the center thereof in a hot working stage (II) at 800°–1200° C. In the hot working stage (II), there occur hot working cracks if the temperature is lower than 800° C., and on the contrary there occurs hot brittleness if the temperature is higher than 1200° C. Therefore the hot working (II) should be carried out at a temperature in the range of 800°–1200° C. Further, the hot forging may be effected by one operation or progressively by a number of operations. The work heated to 800°–1200° C. consists of austenite steel, so that the working rate in the final hot working stage should be greater than 30% for the purpose of making the austenite grains finer in the final hot working stage. A non-magnetic steel is used as a material for the blank to be worked, as it should have non-magnetic property along with a high strength. In order to secure the properties which are required of the stabilizer, namely, the non-magnetic property, high strength and corrosion resistance, it is necessary to work-harden a non-magnetic steel, i.e., low C.high Mn—Cr austenite steel. As for the low C.high Mn—Cr steel with excellent cold working hardenability, it is preferred to select a steel with a basic composition of 0.05–0.3%C, 16–25%Mn and 13–18%Cr, for example, 0.12C-18Mn-15Cr steel.

In the next step, the semi-finished work item 7 is subjected to an ordinary solution heat treatment (III) in which the work item is heated to and retained at, for example, a temperature of 1100° C. and then water-cooled to obtain a second semi-finished work item. The solution heat treatment is preferably to be carried out at a temperature in the range of 1000°–1150° C. because the heating temperature should be above 1000° C. in order to form solid solution of Cr carbides and below 1150° C. in order to prevent coarsening of crystal grains.

Subsequent to the texture control by the heat treatment and water toughening, the second semi-finished work item is machined into a rod 8 of a third semi-finished product which conforms with the stabilizer 2 of the ultimate product in shape and strength. This machining operation is intended for accurate apportionment of the material (weight calculation) in accordance with the theory of cold working of the present invention.

Nextly, the third semi-finished work item 8 is subjected to cold compression working (V) axially in a die with a cavity of a substantially complementary shape to obtain a blank 2 of a stabilizer for oil drilling. The temperature of the work item in this cold compression working stage should be in a range which can induce the hardening by cold working and at the same time not give rise to harmful precipitates. In the case of a non-magnetic steel as in the present invention, it is preferable to conduct the cold compressive working in a temperature range below 350° C., preferably in the range of from room temperature to 350° C. The temperature range of the cold compressive working is in some cases determined depending upon the capacity of the equipment to be actually used for the cold compression working, but it is desired to be from 150° C. to 350° C. in view of the thermal stability of the strength of the blank resulting from the cold compression working and/or the stabilizer.

The blank 2 which is obtained by the method of the present invention in the above-described manner is then subjected to stress relief annealing for several hours at 200°–350° C. to prohibit softening of the stabilizer. Because the temperature is assumed to be elevated to 150° C. at maximum. Service, the annealed work item is then finished in a final machining stage (VII) to obtain a stabilizer 1.

Axial compressive working is effected in the stage of cold working according to the present invention. The technical points and the reason in supporting of such cold working are given below, along with illustrative examples.

In the cold compressive working stage (V), the third semi-finished material or the work item has a portion in which the ratio of its length (l) to its diameter (d), l/d, is greater than 3.0. Generally, when compressing a column which has a value greater than 3.0 for the ratio of l/d, it is difficult to apply the axial compression load without causing bend buckling. It is difficult even if l/d=2.5 especially in a case where the opposite end faces of the column are not supported (or not restricted) and the load is not applied accurately along the axis of the column. Once bend buckling occurs, the bend is magnified in an accelerated manner by an increase in the rate of working.

Figure 4A:
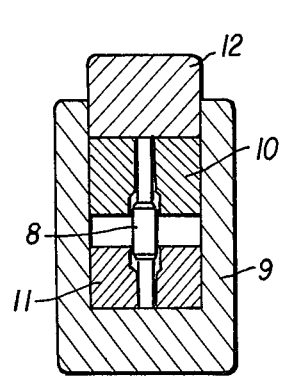
Figure 4B:
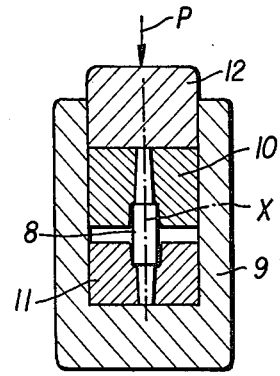

To cope with this problem, the cold compressive working stage (V) according to the present invention employs a tool including an upper die 10 and a lower die 11 which are axially guided in an outer cylinder 9, and a punch 12 which is also guided by the outer cylinder 11, as illustrated in FIG. 4. The third semi-finished work 8 is set in the die as shown in FIG. 4(a), and a compression load (P) is applied in the axial direction (X) of the work as shown in FIG. 4(b) by means of a forging press or the like. At this time, the compressive stress ($\sigma$)

which occurs to a work item with a sectional area (A) is expressed by the equation $$\sigma = P/A \quad (1)$$

In the first place, the outer end portion of the tapered stem 3 of small diameter reaches the plastic deformation range and begins to undergo plastic deformation and hardening by working. As the load is increased, the plastic working progresses toward the inner end of the stem 3, then uniformly subjecting the entire portion of the stem 3 to plastic working.

Figure 5:
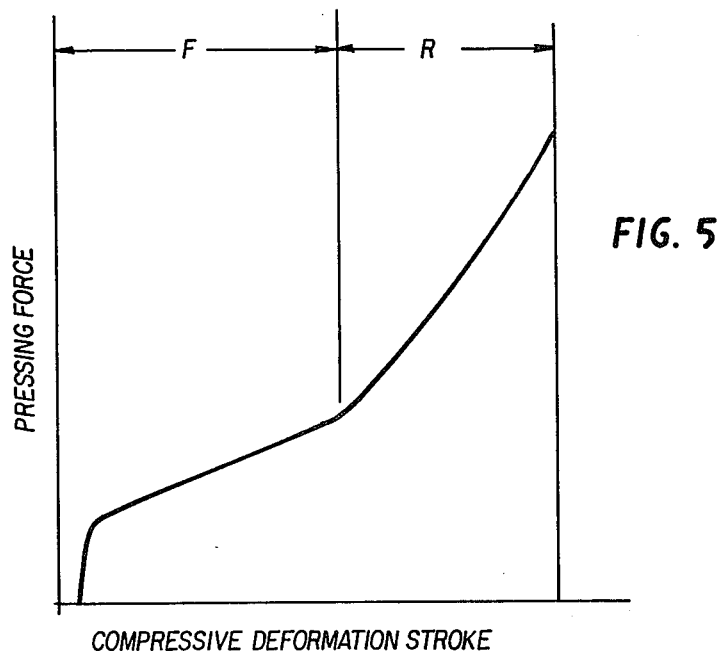
FIG. 5 is a diagram showing the compressive load in a period of compressive deformation.
Figure 4C:
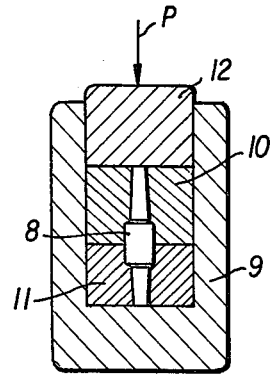

The compression working ratio of the stem 3 is predetermined in consideration of the properties of the blank to be produced. Upon reaching a predetermined compression working ratio, the first phase (F) of the compression working of FIG. 5 is finished, and the upper and lower dies 10 and 11 are abutted against the shoulders 5 of the work item as shown in FIG. 4(b), followed by an increase of the compression load to start the compression working of the bulging portion 4 of large diameter in the center portion of the work item, filling the work item along the shape of the die cavity which is formed complementarily to the shape of the desired ultimate product. As soon as the work item fills the die cavity as shown in FIG. 4(c), the compression load is augmented abruptly due to the increase of the reaction force, and the posterior phase of the working of FIG. 5 is terminated at this point in time. In actual operation, the cold working is performed by a single action and in an extremely efficient manner. As is clear from the smooth compression curve of FIG. 5 which plots the compression load on the ordinate against a period of one compressive deformation on the abscissa, compressive working of the first and second phases can be effected easily and continuously.

Figure 6:
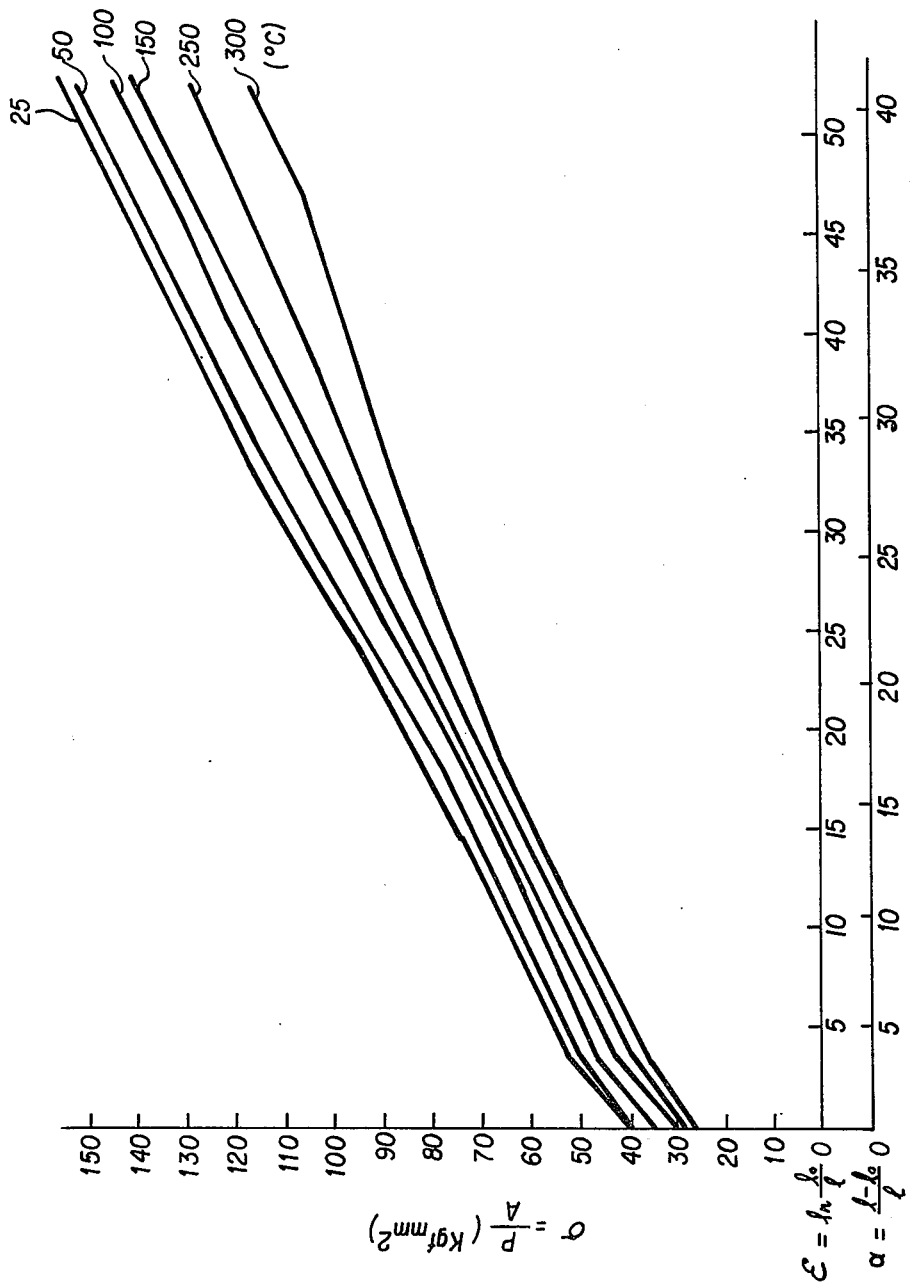
FIG. 6 is a diagram showing the strength in relation with the working rate.

FIG. 6 is a diagram showing the relation of the strength to the working ratio in the cold working of an exemplary material, plotting the desired strength on the ordinate and the distortion ratio of $E = \ln(lo/l)$ (in which lo = the length before working and l = the length after working) on the abscissa at various temperatures which act as a parameter.

What is important in the cold compressive working by the method of the present invention is to cause the plastic deformation uniformly in various parts of the work. For this purpose, it is necessary to give consideration to the correlation between the shape of the ultimately obtained blank 2 (corresponding to the shape of the die cavity) for the stabilizer and the shape and dimensions of the work item prior to the cold working, namely, of the third semi-finished work item 8. More particularly, although the shape of the die cavity is provided with a taper of 0.5° to 5° to facilitate the withdrawal of the work item after completion of the cold working operation, it is required to maintain the same compressive working ratio at different positions along the axial direction of the work item in spite of the existence of the taper. It is also necessary to take into consideration the fact that the application of the compressive strain in the axial direction causes additional tensile strain in the radial and circumferential directions of the work item. Further, the bend buckling which may occur to the work item has to be restricted within the die while shaping and hardening the work item into appropriate shape and dimensions. For this purpose, it is necessary to make calculations beforehand to correctly determine the volume and dimensions of the work item.

The calculations for the stem portions 3 at the opposite ends of the work item are made separately from the bulging center portion 4. Taking one stem portion 3 as an example, it is positioned in the die with the outer and inner ends thereof in the smaller- and larger-diameter portions of the tapered die cavity, respectively. With regard to the length of the work, since $$E = \ln(lo/l) \quad (2),$$

the length before working is expressed by $$lo = e^E \cdot l \quad (3).$$

The the diameters of the outer end before and after working being do and d, and the diameters of the inner end before and after working being Do and D, respectively, the following relations are obtained.

$$\text{from } E = \ln(d/do)^2 \quad (4),$$

$$do = (e^E)^{-\frac{1}{2}} d \quad (5)$$

and $$\text{from } E = \ln(D/Do)^2 \quad (6),$$

$$Do = (e^E)^{-\frac{1}{2}} D \quad (7)$$

Therefore, from Equations (3), (5) and (7), the taper angle θ of the work before cold working is expressed by $$\theta = \tan(Do - do/2lo) \quad (8)$$

The value of θ does not coincide with the taper angle of the tool which is determined so as not to invite a state of contacting restriction of the work. The reason why logarithmic strain is used in the foregoing calculations is for the purpose of discussing the axial compressive working rate and the radial and circumferential tensile working rates on the same scale.

Figure 7:
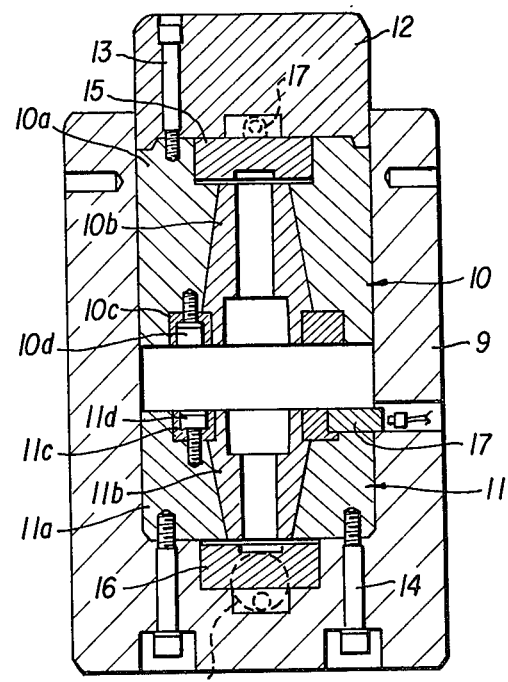
FIG. 7 is a vertically sectioned side view of a tool useful in the cold compressive working according to the method of the invention.
Figure 8:
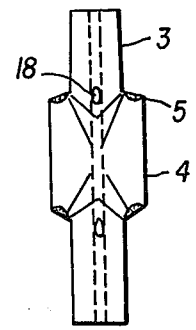
FIG. 8 is a diagrammatic view showing the qualitative hardness distribution in the vertically sectioned area of a stabilizer obtained by the method of the present invention.

Referring to FIG. 7, there is shown an example of the apparatus useful for carrying out the cold compressive working according to the present invention, including an upper die 10 and a lower die 11. The upper die 10 is constituted by an outer support 10a and an inner impression member 10b (a core die) with a shaping cavity on the inner side, which are connected by a recessed supporter 10c and a hexagon socket bolt 10d. Similarly, the lower die is constituted by an outer support 11a and an inner impression number 11b, which are connected by a recessed support 11c and a hexagon socket bolt 11d. The impression member 10b and 11b are replaceable according to the shape of the work item to be handled. The upper die 10 is fixed to a pressing die 12 by bolts 13, while the lower die 11 is fixed to the outer cylinder 9 by bolts 14. Indicated at 15 and 16 are supports for the upper and lower dies 10 and 11, respectively, and at 17 rams for adjusting the position of the die.

Thus, according to the present invention, the work item is preadjusted by predetermined procedures and in consideration of working conditions prior to the cold compressive working stage. As a result of actual measurement of hardness at 1264 different points over the entire surface of a vertically sectioned area of the stabilizer 2, it has been confirmed that the work item is hardened substantially uniformly by the cold compressive working. Upon studying the strain distribution in greater detail, it is observed that the stem portions 3 are substantially uniform, and non-deformed soft portions exist in a shallow surface layer of shoulders 5 and in the center dead metal zone 18 which is softer by about 10%. The shear strain zone 19 including the fillet portion is harder by about 10–15% and contributes effectively to the structural strength. The soft portions 5 and 18 give rise to no problems in strength since they are cut off in the subsequent finish machining stage (VII).

EXAMPLE

Figure 9:
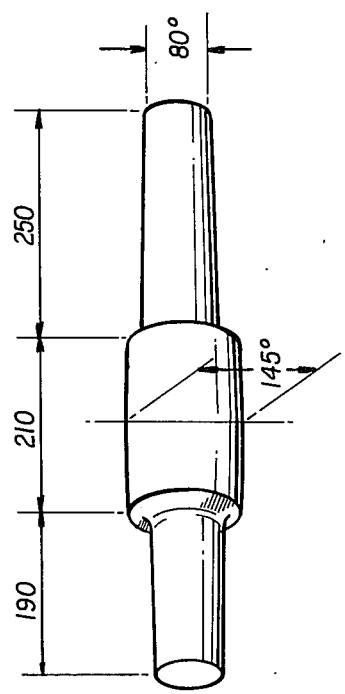
FIGS. 9 to 11 are diagrammatic views showing the shape, sampling positions of specimens, hardness distribution and qualitative characteristics of strength of the blank for stabilizer produced by the method of the present invention, respectively.

A non-magnetic steel having a basic composition of 0.12%C-18%-MN-15%-Cr was hot-forged in a temperature range of 1000°–850° C. and then subjected to a solution heat treatment and a machining operation to obtain a semi-finished work item. The semi-finished work item was formed into a blank for stabilizer, as shown in FIG. 9, by cold compressive working (cold die forging) applying a compressive load in the axial direction of the work item.

Figure 10:
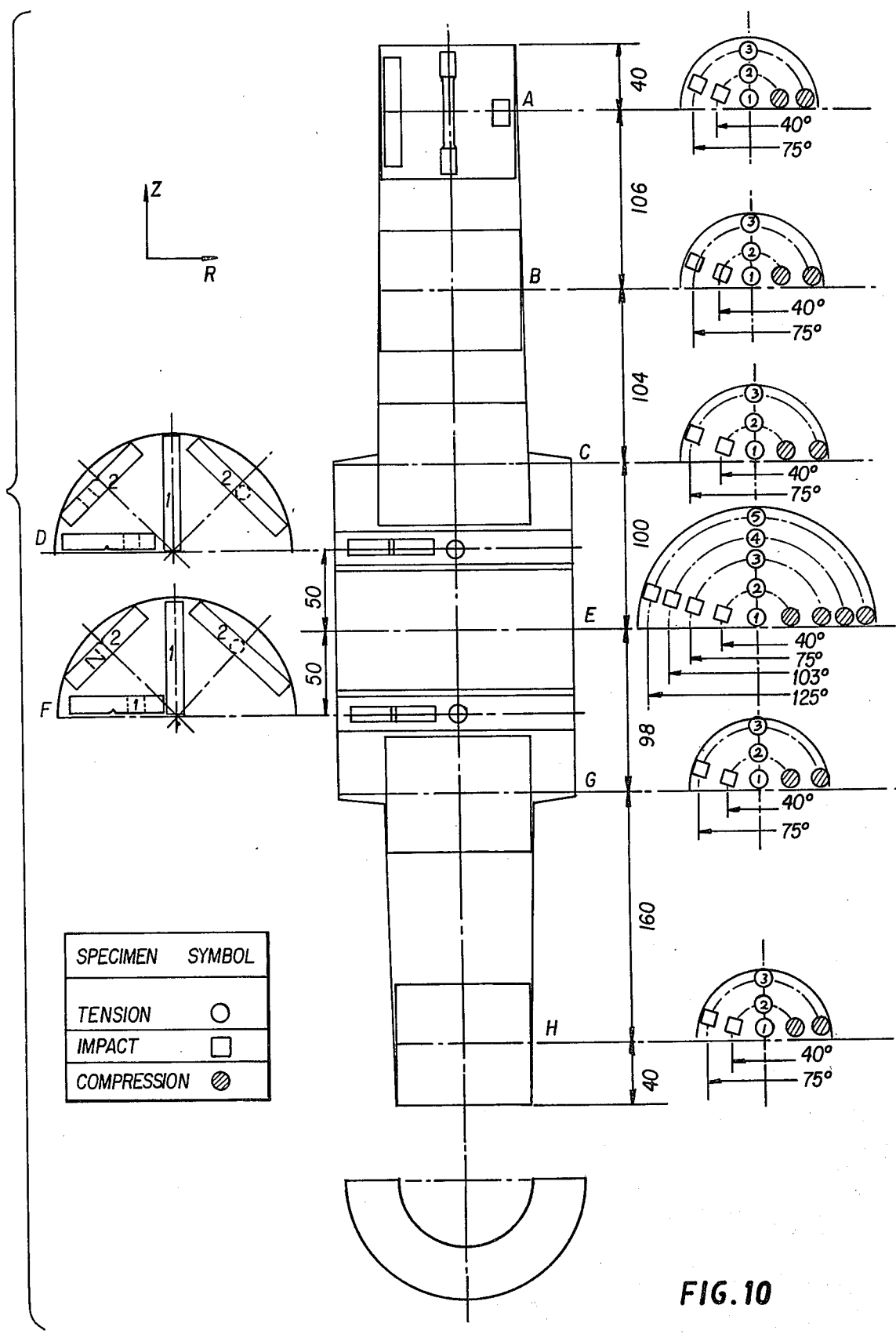

FIG. 10 shows the sampling positions of specimens which were used in determination of properties of the thus obtained blank for a stabilizer. Each specimen was bisected in the axial direction, using one for measurement of hardness distribution and the other one for the measurement of mechanical properties and specific magnetic permeability.

bulging center portion more than the stem portions in terms strength, with uniform hardness distribution in the radial and circumferential directions. Moreover, the cold compressive working according to the method of the present invention can separately control the hardness of the bulging center portion and the stem portions if desired.

(b) Mechanical Properties

From each one of sections A to H located at different positions in the axial direction of the blank for a stabilizer shown in FIG. 10, specimens were sampled at radial sampling positions 1 to 5. As shown in FIG. 10, the longitudinal sides of specimens sampled from the blank sections A to C, E, G and H lay in the axial direction at the respective sampling positions 1 to 5. On the other hand, the longitudinal sides of specimens sampled from the sections D and F lay in the radial direction at the sampling position 1 and in the circumferential direction at the sampling position 2. Table 1 shows the results of compression and tensile tests of the specimens obtained from the above-mentioned sampling positions of the respective blank sections.

TABLE 1

Mechanical properties of the non-magnetic stabilizer strengthened by cold die forging

| Location of specimens[1] | | | Compression | Tension | | | | Impact |
|---|---|---|---|---|---|---|---|---|
| Site | | | 0.2% P.S. | 0.2% P.S. | T.S. | El. | R.A. | VE20 |
| Axial | Radius | Direction | (kgf/mm$^2$) | (kgf/mm$^{2l}$) | (kgf/mm$^2$) | (%) | (%) | (kg · m) |
| A | 1 Inner | Axial | — | 72.8 | 96.5 | 30.3 | 69.8 | — |
|   | 2 ½R | " | 92.1 | 70.6 | 97.6 | 29.0 | 69.8 | 13.9 |
|   | 3 Outer | " | 101.4 | 71.4 | 98.7 | 32.7 | 68.7 | 13.3 |
| B | 1 Inner | " | — | 71.5 | 98.6 | 30.4 | 68.0 | — |
|   | 2 ½R | " | 85.7 | 71.5 | 98.6 | 30.4 | 68.0 | 14.7 |
|   | 3 Outer | " | 94.1 | 70.8 | 98.8 | 29.0 | 68.0 | 13.6 |
| C | 1 Inner | " | — | 70.5 | 98.0 | 35.0 | 67.3 | — |
|   | 2 ½R | " | 86.4 | 73.2 | 101.0 | 30.9 | 68.5 | 13.8 |
|   | 3 Outer | " | 98.0 | 79.6 | 107.2 | 26.0 | 62.8 | 13.2 |
| D | —1 | Radius | — | 93.9 | 109.6 | 25.6 | 63.0 | 14.8 |
|   | —2 | Tangential | — | 81.7 | 101.4 | 26.8 | 62.6 | 15.2 |
| E | 1 Inner | Axial | — | 78.0 | 106.0 | 26.1 | 63.1 | — |
|   | 2 ¼R | " | 110.0 | 78.0 | 107.4 | 26.1 | 64.1 | 9.9 |
|   | 3 ½R | " | 107.3 | 78.9 | 108.1 | 26.1 | 62.0 | 10.2 |
|   | 4 ¾R | " | 101.7 | 79.8 | 109.2 | 26.6 | 65.2 | 9.9 |
|   | 5 Outer | " | 97.6 | 80.1 | 111.3 | 26.2 | 64.1 | 8.5 |
| F | —1 | Radius | — | 92.4 | 109.6 | 25.1 | 62.5 | 13.8 |
|   | —2 | Tangential | — | 83.1 | 102.0 | 26.1 | 61.0 | 15.0 |
| G | 1 Inner | Axial | — | 70.3 | 96.8 | 28.2 | 62.6 | — |
|   | 2 ½R | " | 85.8 | 73.2 | 102.2 | 26.4 | 63.0 | 13.1 |
|   | 3 Outer | " | 97.6 | 79.6 | 109.5 | 26.2 | 63.0 | 12.3 |
| H | 1 Inner | " | — | 71.1 | 96.2 | 31.0 | 68.0 | — |
|   | 2 ½R | " | 90.1 | 70.2 | 96.6 | 30.5 | 68.0 | 13.5 |
|   | 3 Outer | " | 98.6 | 71.6 | 99.5 | 29.8 | 68.3 | 12.8 |

[1]See FIG. 10

(a) Hardness Distribution

Figure 11:
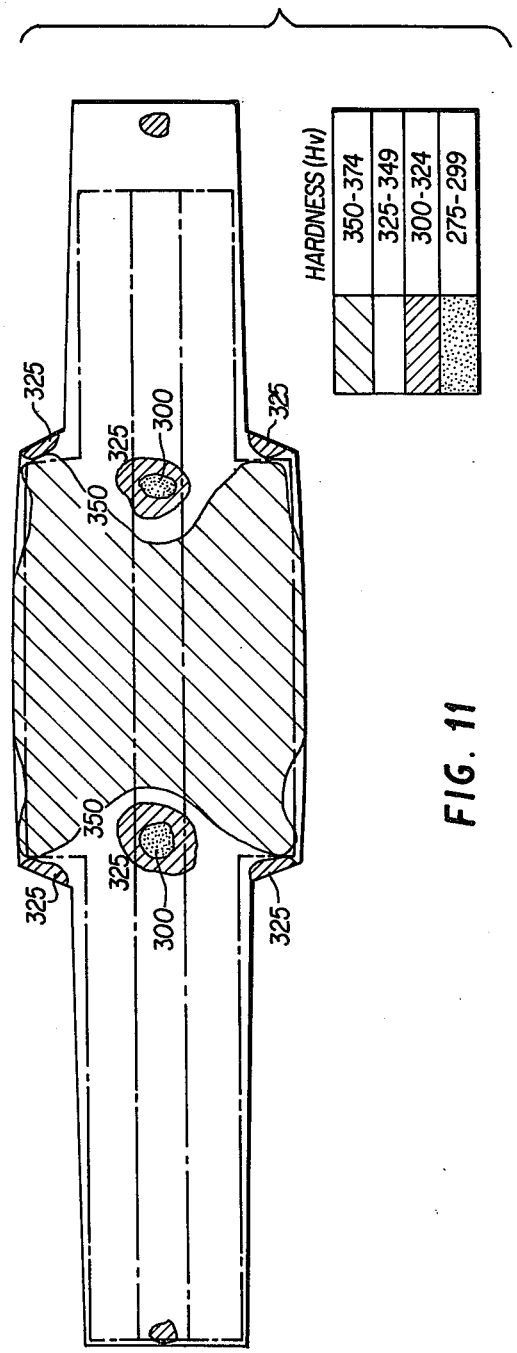
Figure 12:
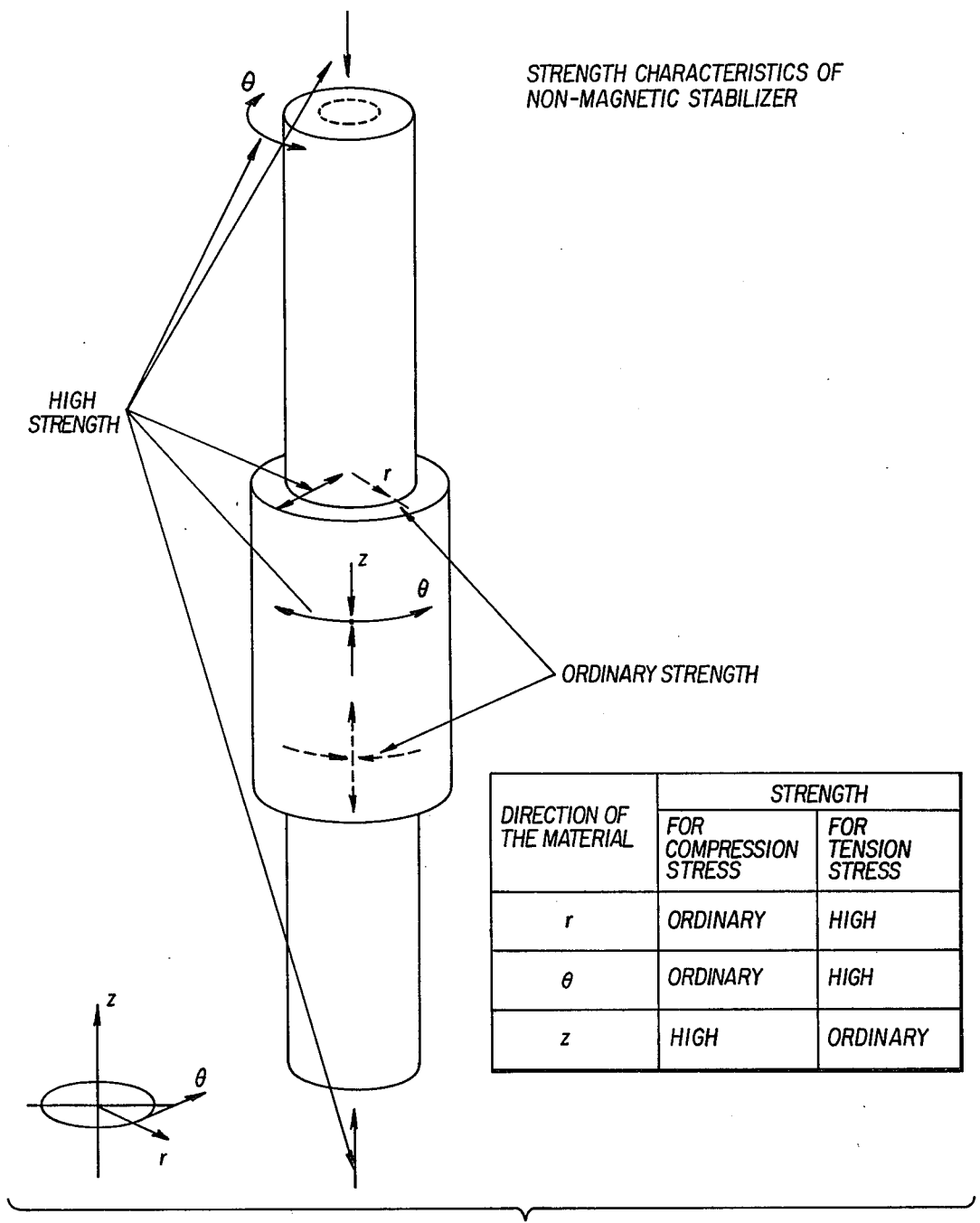
FIG. 12 shows a stabilizer blank according to the present invention.

FIG. 11 shows the hardness distribution of each specimen along with hardness (Hv) of measured points. Generally, this sort of product manufactured by the conventional method is hardened only in its surface layer and exhibits irregularities in the hardness distribution in the radial and circumferential directions, coupled with the difficulty of enhancing the strength of the bulging center portion to a level higher than that of the stem portions. In contrast, as is clear from the hardness distribution and values of hardness (Hv) shown in FIG. 11, the method of the present invention can increase the As is clear from Table 1, the compressive 0.2% yield strength in the axial direction of the blank sections A to C, E, G and H varied depending upon the radial sampling position of the specimen but all specimens showed a high level of strength in the range of 85–110 kgf/mm$^2$. The tensile 0.2% proof stress in the radial and circumferential directions of the blank sections D and F was at a high level of 81–94 kgf/mm$^2$ which was higher than the tensile 0.2% proof stress in the axial direction of the blank sections A to C, E, G and H. It is a feature of the cold compressive working method of the present invention to provide a product with such strength characteristics. More specifically, the stabilizer blank produced by the method of the present invention has a tendency as shown qualitatively in FIG. 12, showing a high strength against compressive stress in the axial direction and tensile stress in the circumferential and radial directions. In the case of the tap forging and tensile working mentioned hereinbefore, the product possesses strength characteristics of an inverse tendency.

(c) Specific magnetic permeability

The measurement of specific magnetic permeability ($\mu$) revealed that all specimens had a specific magnetic permeability of $\mu \simeq 1.002 < 1.01$, retaining a suitable non-magnetic property even after the cold compressive working.

As is clear from the foregoing description, the method of the present invention can manufacture a stepped rod-like blank of non-magnetic steel suitable for a stabilizer for oil drilling in such a manner that the blank is imparted with uniformly high strength and toughness, permitting an increase in the service life of the stabilizer to a marked degree.

What is claimed is:

1. A method of manufacturing a blank for an oil drilling stabilizer, which comprises:
   hot working a stock of non-magnetic steel into a rod-like work item form with a bulging large-diameter portion at a median point thereof and between opposite ends thereof;
   subjecting said rod-like work item to a solution heat treatment and a machining operation to obtain a semi-finished work item with a shape substantially conforming with a shape of a desired product; and
   subjecting said semi-finished work item to cold axial compressive working in a die cavity of a substantially complementary shape and within a predetermined work hardening temperature range.

2. The method as set forth in claim 1, wherein said work hardening temperature range is below 350° C.

3. The method as set forth in claim 2, wherein said work hardening temperature range is from room temperature to 350° C.

4. A method as set forth in claim 3, wherein said work hardening temperature range is from 150°–350° C.

5. The method as set forth in claim 1, wherein said hot working step further comprises hot working at a heating temperature of 800°–1200° C.

6. The method as set forth in claims 1 or 5, wherein said step of hot working further comprises hot working a rate greater than 30%.

7. The method as set forth in claim 1, wherein said step of subjecting said rod-like work item to said solution heat treatment further comprises subjecting said work item to a solution heat treatment within a temperature range is 1000°–1150° C.

8. A method of manufacturing an oil drilling stabilizer, which comprises:
   hot-working a stock of non-magnetic steel into a rod-like work item form with a bulging large-diameter portion at a median point thereof and between opposite ends thereof;
   subjecting said rod-like work item to a solution heat treatment and a machining operation to obtain a semi-finished work item with a shape substantially conforming with a shape of a desired product;
   subjecting said semi-finished work item to cold axial compressive working in a die cavity of a substantially complementary shape and within a predetermined work hardening temperature range;
   subjecting said work item to stress relief annealing; and
   subsequently subjecting said work item to a finish machining operation.

9. The method as set forth in claim 8, wherein said step of stress relief annealing further comprises stress relief annealing at a temperature range of 200°–350° C.

10. The method as set forth in claim 8, wherein said step of cold axial compressive working further comprises compressive working a temperature range below 350° C.

11. The method as set forth in claim 10, wherein said step of cold axial compressive working further comprises compressive working at a temperature range of from room temperature to 350° C.

12. The method as set forth in claim 11, wherein said step of cold axial compressive working further comprises compressive working at a temperature range of 150°–350° C.

13. The method as set forth in claim 8, wherein said step of hot working further comprises hot working at a heating temperature of 800°–1200° C.

14. The method as set forth in claims 8 or 13, wherein said step of hot working further comprises hot working a rate of greater than 30%.

15. The method as set forth in claim 8, wherein said step of subjecting said rodlike work item to said solution heat treatment further comprises subjecting said work item to a solution heat treatment within a temperature range of 1000°–1150° C.

16. The method as set forth in claim 1, wherein said blank for oil drilling stabilizer further comprises a blank having a 0.2% yield strength greater than 70 kg/mm$^2$.

17. The method as set forth in claim 1, wherein said blank for oil drilling stabilizer further comprises a blank having a specific magnetic permeability of less than 1.01.

18. The method as set forth in claim 8, wherein said oil drilling stabilizer further comprises a blank having a 0.2% yield strength greater than 70 kg/mm$^2$.

19. The method as set forth in claim 8, wherein said oil drilling stabilizer further comprises a stabilizer having a specific magnetic permeability of less than 1.01.

* * * * *